United States Patent [19]

Cumpston, Jr.

[11] 3,960,524
[45] June 1, 1976

[54] AIR SCRUBBER

[76] Inventor: Edward H. Cumpston, Jr., 43 Monument Ave., Old Bennington, Vt. 05201

[22] Filed: Oct. 29, 1974

[21] Appl. No.: 518,467

Related U.S. Application Data

[63] Continuation-in-part of Ser. No. 429,214, Dec. 28, 1973, abandoned, which is a continuation-in-part of Ser. No. 280,950, Aug. 16, 1972, abandoned.

[52] U.S. Cl. .................................... 55/86; 55/92; 55/94; 55/230; 55/247
[51] Int. Cl.² ...................................... B01D 47/16
[58] Field of Search ............... 55/35, 86, 91, 92, 94, 55/230, 239, 431, 247–249

[56] References Cited
UNITED STATES PATENTS

| | | | |
|---|---|---|---|
| 2,590,342 | 3/1952 | Niehaus et al. | 55/230 |
| 2,857,979 | 10/1958 | Van Dijck | 55/431 |
| 3,303,634 | 2/1967 | Berrian | 55/35 |
| 3,358,413 | 12/1967 | Kalika | 55/230 |
| 3,581,467 | 6/1971 | Donnelly | 55/89 |

*Primary Examiner*—John Adee
*Attorney, Agent, or Firm*—Stonebraker, Shepard & Stephens

[57] ABSTRACT

An air scrubber has inner and outer concentric annular chambers separated by a common wall and an inlet to the outer chamber and an outlet from the inner chamber. The chambers connect together at one end of the scrubber, and a fan draws air from the outer chamber and forces it out through the inner chamber. The common wall has a circulation opening and the scrubber contains a quantity of liquid circulated through the chambers and the fan to spray through the opening in the common wall to mix with incoming air, to pass through the fan as a finely divided mist, and to return to the opening. Scrubbing liquid is input periodically and output through a preferably adjustable output opening to regulate the quantity of liquid circulated through the scrubber by the fan. Aerosol eliminator openings along the air outlet passageway aid in removal of any liquid aerosol still entrained in the output air.

39 Claims, 13 Drawing Figures

FIG. 13

AIR SCRUBBER

RELATED APPLICATIONS:

This application is a continuation-in-part of my parent application, Ser. No. 429,214, filed Dec. 28, 1973, entitled AIR SCRUBBER, (abandoned upon filing of this application), which was a continuation-in-part of grandparent application Ser. No. 280,950, filed Aug. 16, 1972, entitled IMPROVED AIR WASHER APPLICATION, abandoned upon the filing of Application Ser. No. 429,214.

THE INVENTIVE IMPROVEMENT

Many industrial processes produce air pollution that is unpleasant or hazardous to workers or damaging to machinery, and such air pollution can have many forms. For example, the air becomes laden with ink and paper floc around printing presses, with cutting oil around machining tools, and with grease in kitchens. Objectionable air pollution also includes odors, lint, dust, smoke, and many other materials that must be removed for safety, comfort, and efficiency. Many of these materials are in the form of tiny particles a small fraction of a micron in size, and prior art air scrubbers have experienced considerable difficulty in removing such pollutants from the air. Any device involving a filter has problems because the filter will eventually clog up and need cleaning or replacement, and use of fine spray nozzles causes similar difficulty when nozzles clog up. A successful scrubber cannot have places where materials can collect and clog up the device, or periodic cleanings are necessary, and if the scrubber uses liquid-gas contacting, the liquid must be intimately mixed with the gas for thorough contacting, and then the liquid must be substantially completely separated from the gas. These problems are substantial enough so that prior art scrubbers have failed to solve them all.

The invention involves recognition of a better way to make an air scrubber that is thorough and efficient in removing all sorts of materials from the air, including odor-producing materials and extremely small particles. The invention aims at an air scrubber that is versatile, efficient, thorough, easy to service and operate, reliable, trouble free, and effective in cleaning the air.

SUMMARY OF THE INVENTION

The inventive air scrubber has inner and outer concentric annular chambers separated by a cylindrical common wall with a fan arranged in one end of the inner chamber for drawing from the outer chamber and outputting into the inner chamber. The inside of the cylindrical wall is substantially smooth and the inner chamber is unobstructed to produce as little turbulence as possible in the output from the fan. A clean air outlet from the inner chamber is opposite the fan, and the scrubber holds a quantity of liquid. The cylindrical wall has a circulation opening which is arranged between the inner chamber downstream of the fan and the other chamber upstream of the fan, and the circulation opening intercepts the entire path of the output of the fan. A contaminated-air inlet into the outer chamber is upstream of the circulation opening, and the cylindrical wall has a plurality of aerosol eliminator openings throughout a region between the circulation opening and the outlet so that the outside of the aerosol eliminator openings communicate with the air inlet in the outer chamber. The fan is turned fast enough to produce a substantial pressure drop from the inner chamber to the outer chamber to force a portion of the air and substantially all of the liquid through the circulation opening into the outer chamber in a high-velocity spray of liquid particles directed into incoming air from the inlet and to draw a portion of the air and substantially all aerosol particles through the aerosol eliminator openings back into the outer chamber. The fan also moves the entire quantity of liquid along with rapidly moving air and breaks the liquid into finely divided particles, and the output of the fan is driven in a high-velocity helical path in the inner chamber to subject the air and liquid particles to a very high centrifugal force centrifugally concentrating the liquid particles against the cylindrical wall and helping to force the liquid through the circulation opening and to draw the aerosol through the aerosol eliminator openings.

DETAILED DESCRIPTION

The inventive air scrubber is efficient, simple, compact, and can be operated continuously with little maintenance or attention. It does not use filters or spray nozzles that can clog up, and all its internal surfaces are swept clean with a high-velocity air stream during operating, so that there is no opportunity for it to plug up. It uses a volume of liquid suitable for removing the particular pollutants in the contaminated air and it keeps the entire volume of liquid suspended in the air and circulating round and round rapidly the air scrubber. It divides the liquid finely into a mist to produce a large liquid surface intimately contacting the air, it mixes the air and the mist thoroughly together, and then it separates the liquid substantially completely from the cleaned air. The recirculation of air and liquid in the scrubber is adjustable, and the quantity of liquid recirculated within the scrubber is self adjusting so that the scrubber operates stably for long periods of time with little attention required. The way these features and advantages are achieved will be described below.

Figure 1:
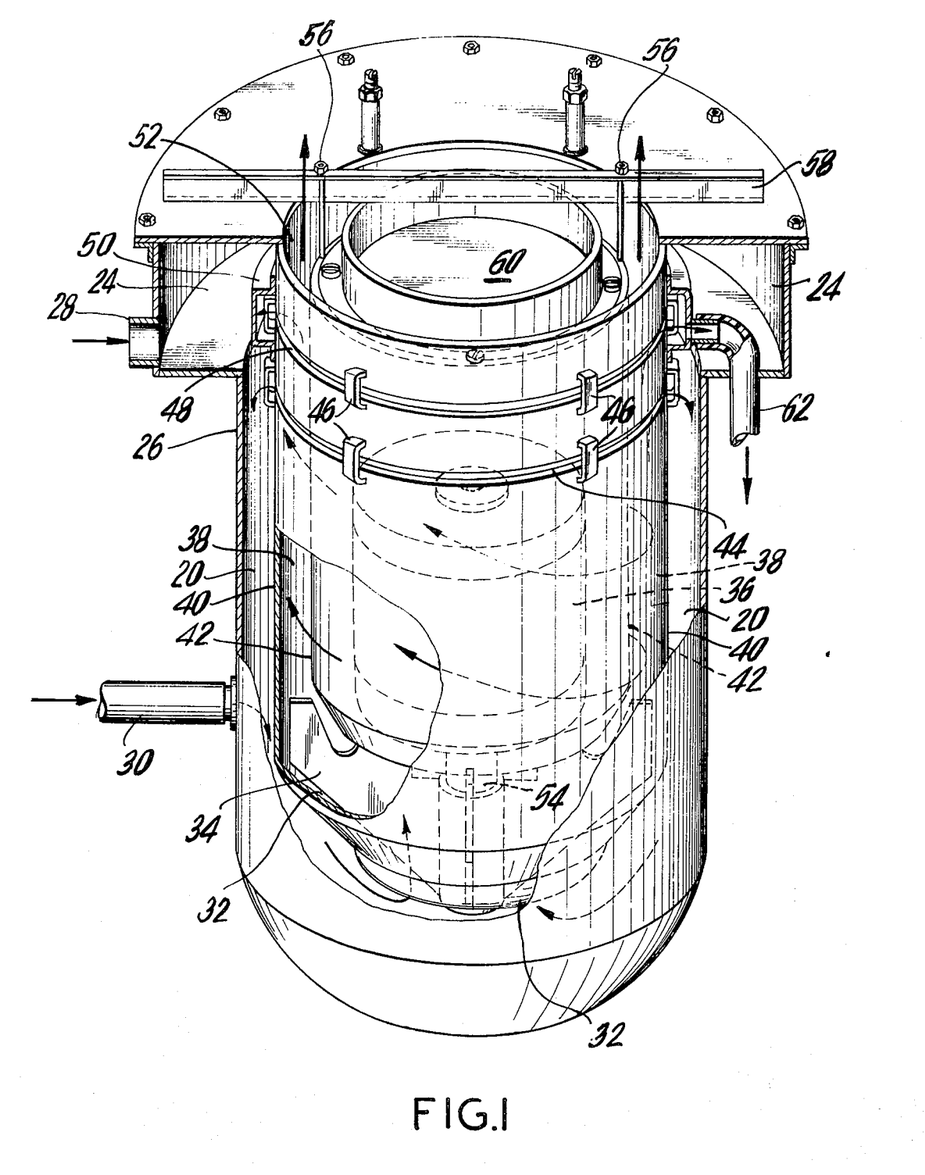
FIG. 1 is a cut-away and partially cross-sectioned view of a preferred embodiment of an air scrubber according to the invention.
Figure 2:
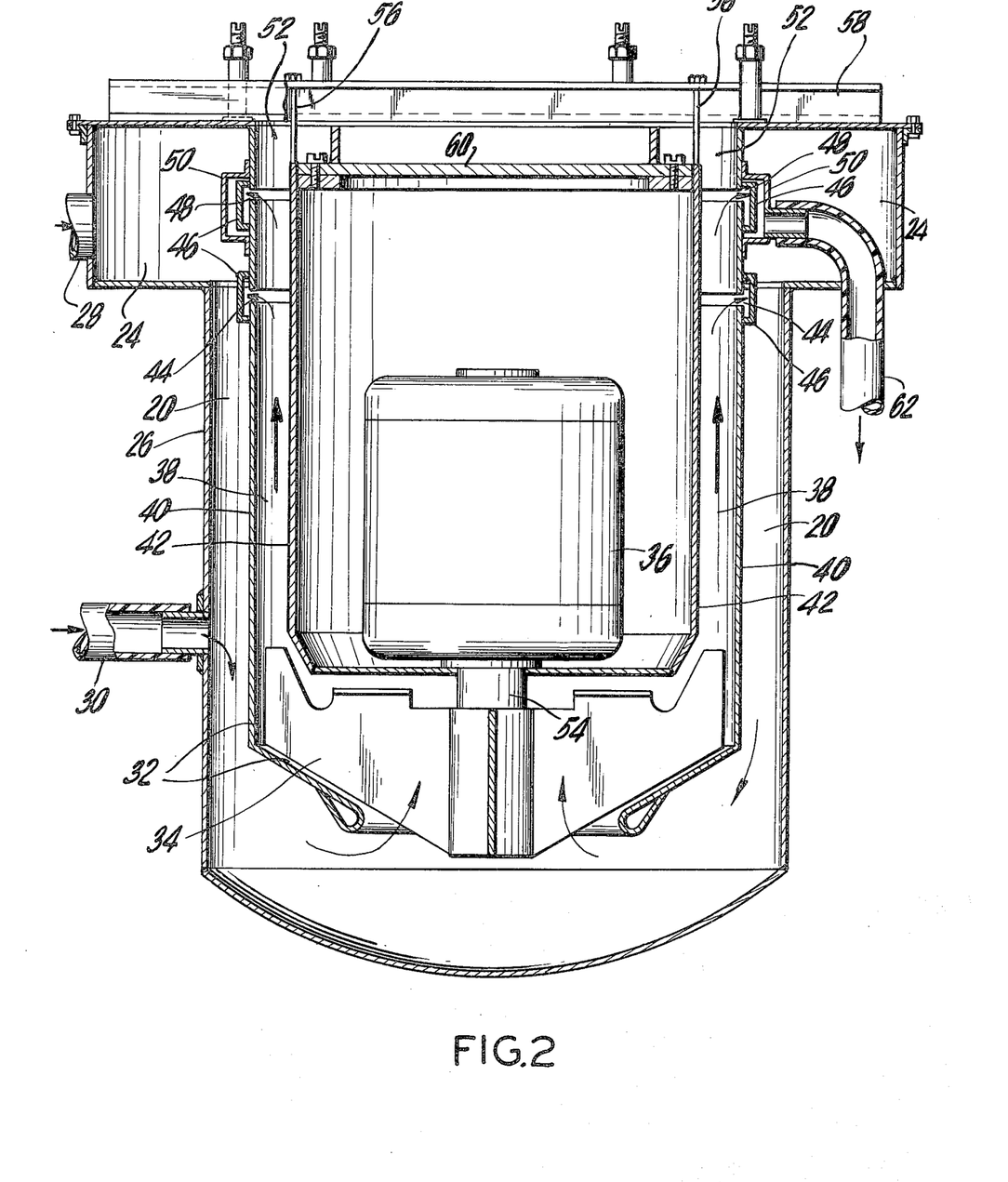
FIG. 2 is a cross-sectional, elevational view of the air scrubber of FIG. 1.

The air scrubber of FIGS. 1 and 2 is illustrated as vertically oriented, but can be operated in other orientations, because the circulational forces within the scrubber substantially control the liquid and air flow apart from the influence of gravity. The inventive air scrubber has an outer annular chamber 20 and an inner annular chamber 38 separated by a cylindrical common wall 40, and outer chamber 20 has an air intake 24 connected to the upper part of the exterior wall 26 of outer chamber 20. Intake 24 can be a single hose or conduit connection or a manifold having any desired number of intake ports 28 opening at the ambient atmosphere or connected to conduits for drawing in contaminated air.

A liquid inlet tube 30 connected to outside wall 26 admits scrubbing solution into outer chamber 20, but scrubbing liquid can be input in many other ways including input into the contaminated air inlet.

Inner chamber 38 and outer chamber 20 join in a connecting chamber 32 at the lower end of the air scrubber so that air flows from outer chamber 20 through connecting chamber 32 and up into inner chamber 38. A fan 34 arranged in connecting chamber 32 is driven by motor 36 conveniently arranged inside the inner wall 42 of inner chamber 38 to accomplish several functions in the air scrubber as described below.

Fan 34 draws contaminated air from substantially the entire annular extent of inlet chamber 20 with sufficient force to produce a partial vacuum in chamber 20, and fan 34 forces air through outlet chamber 38 to provide a relatively high pressure in chamber 38. This produces a substantial pressure difference between chambers 38 and 20 on opposite sides of common wall 40. Fan 34 also suspends and circulates a quantity of scrubbing liquid through the air scrubber, and an annular circulation slot 44 in common wall 40 allows scrubbing liquid to move from inner chamber 38 to outer chamber 20 and circulate round and round between chambers 38 and 20 and through fan 34.

Beginning with slot 44, liquid moving up along common wall 40 sprays forcefully through slot 44 as a fine spray of drops mixing with incoming contaminated air entering outlet chamber 20. Air is moving downward in outer chamber 20 fast enough to keep the liquid drops entrained in the air. Fan 34 breaks the liquid drops into an atomized mist and vigorously and intimately mixes the mist with the air for cleaning the air. The output from fan 34 is a high-velocity helical flow through chamber 38 spinning round and round chamber 38 continuously for a substantial distance as it moves axially along chamber 38 to produce substantial centrifugal forces on the liquid particles mixed with the air. Since the liquid particles have a greater mass than the air molecules, they are forced outward against common wall 40 by the continuous centrifugal force as the flow proceeds upward. By the time the flow reaches slot 44, most of the liquid is separated from the air and is flowing along common wall 40 in a continuous sheet that sprays forcefully through slot 44 because of the large difference in pressure between chambers 38 and 20. In the process of contacting the scrubbing liquid intimately with the air, the liquid captures and retains or reacts with contaminants in the air.

Legs or brackets 45 are connected at intervals across slot 44 and are spaced out from common wall 40 to make slot 44 continuous and open around the entire circumference of common wall 40. Brackets 46 keep the portions of wall 40 on opposite sides of slot 44 accurately concentric for minimum turbulence in the air flowing past slot 44. Any disruption of the air flow causing turbulence helps the air pick up and entrain liquid, and since almost all the liquid should recirculate through slot 44 and not be entrained by the air passing slot 44, so concentricity of the walls on opposite sides of slot 44 is preferred.

Some liquid will pass beyond slot 44 and move further up wall 40 beyond slot 44 to another annular slot 48 established around common wall 40 by another set of brackets 46. A drain or liquid collector 50 extends around upper slot 48 for collecting scrubbing solution that moves out through slot 48. Air passing beyond slot 48 is discharged through top opening 52, and scrubbing solution collected in drain 50 is outlet through a waste line 62.

Inner wall 42 of chamber 38 serves as the housing for motor 36 which drives fan 34 by shaft 54, and the bottom of wall 42 also forms an upper wall for connecting chamber 32. A removable top 60 permits access to motor 36, and housing 42 and motor 36 are suspended in the air scrubber by hanging bolts 56 secured to support bar 58 fastened to the top of intake manifold 24.

Slots in common wall 40 can be formed in several ways as described in more detail below. Also, slots in wall 40 are preferably adjustable to control both the circulation of air and the quantity of liquid recirculating within the air scrubber. A continuous annular slot such as slot 44 works well for recirculating liquid, and can be from 1/32 inch to ¼ inch in width. Slot 44 is preferably adjustable in width as described below and widening slot 44 tends to recirculate more air round and round through the fan and inner and outer chambers 38 and 20 along with the liquid recirculation and to reduce the air throughput rate and output velocity. Narrowing slot 44 reduces the amount of air recirculation, increases the air throughput rate, and speeds up the air output velocity.

The inventive air scrubber as generally illustrated in the drawings is about 16 to 18 inches in overall diameter, and 2 to 3 feet long and powered by a 5 h.p. motor driving fan 34. Also, the radial width of the inner and outer chambers 38 and 20 are preferably about 1/10 of the dimension of such chambers. On such a scale, the inventive scrubber can clean air at 1500 cubic feet per minute using about a 2½ gallon supply of recirculated scrub solution. The air and liquid velocities within the air scrubber reach 12,000 feet per minute, and it is estimated that the 2½ gallon supply of scrubbing solution recirculates around the scrubber and through the fan at a recirculation rate of about 150 gallons per minute. Also, fan 34 breaks the liquid into a finer spray mist than could be produced by nozzles. One hundred fifty gallons per minute of liquid could not be sprayed into a fan impeller satisfactorily with nozzles without causing surges unbalancing or damaging the impeller, and such a liquid recirculation rate has not been achieved in prior art scrubbers of comparable size. The high liquid recirculational rate is made possible by spraying the liquid into droplets around the entire annular extent of outer chamber 20 so that the liquid enters fan 34 as a multiple of drops entrained in the high-velocity air stream. Fan 34 can then accept the high rate of flow of liquid drops and break the drops into a fine mist for an enormous liquid surface contact area with the air.

A motor can also be arranged outside the inventive air scrubber to drive the fan blade with pulleys, belts and drive shafts. In scaling the scrubber up or down and using different diameter fans 34, different rotational speeds may be desired, and belt or gear drives can be used to provide the desired speed from a motor located outside the scrubber.

Scrubbing liquid is preferably input intermittently into the inventive air scrubber either through line 30 or the air inlet or at some other convenient location. The total quantity of liquid recirculating in the air scrubber is self adjusting and self stabilizing, because if liquid is input at a more rapid rate, then more liquid passes over slot 44 and is taken off through drain slot 48. It has been found that too rapid a feed rate of scrubbing liquid can reduce the efficiency of the air scrubber, and for an air scrubber having the general parameters described above, a liquid output rate of about three-quarters of a gallon per hour with a somewhat higher input rate to accommodate evaporation is preferred for optimum efficiency. The liquid input and output rates also vary for different pollutants, different scrubbing liquids, and different operating environments.

Figure 3:
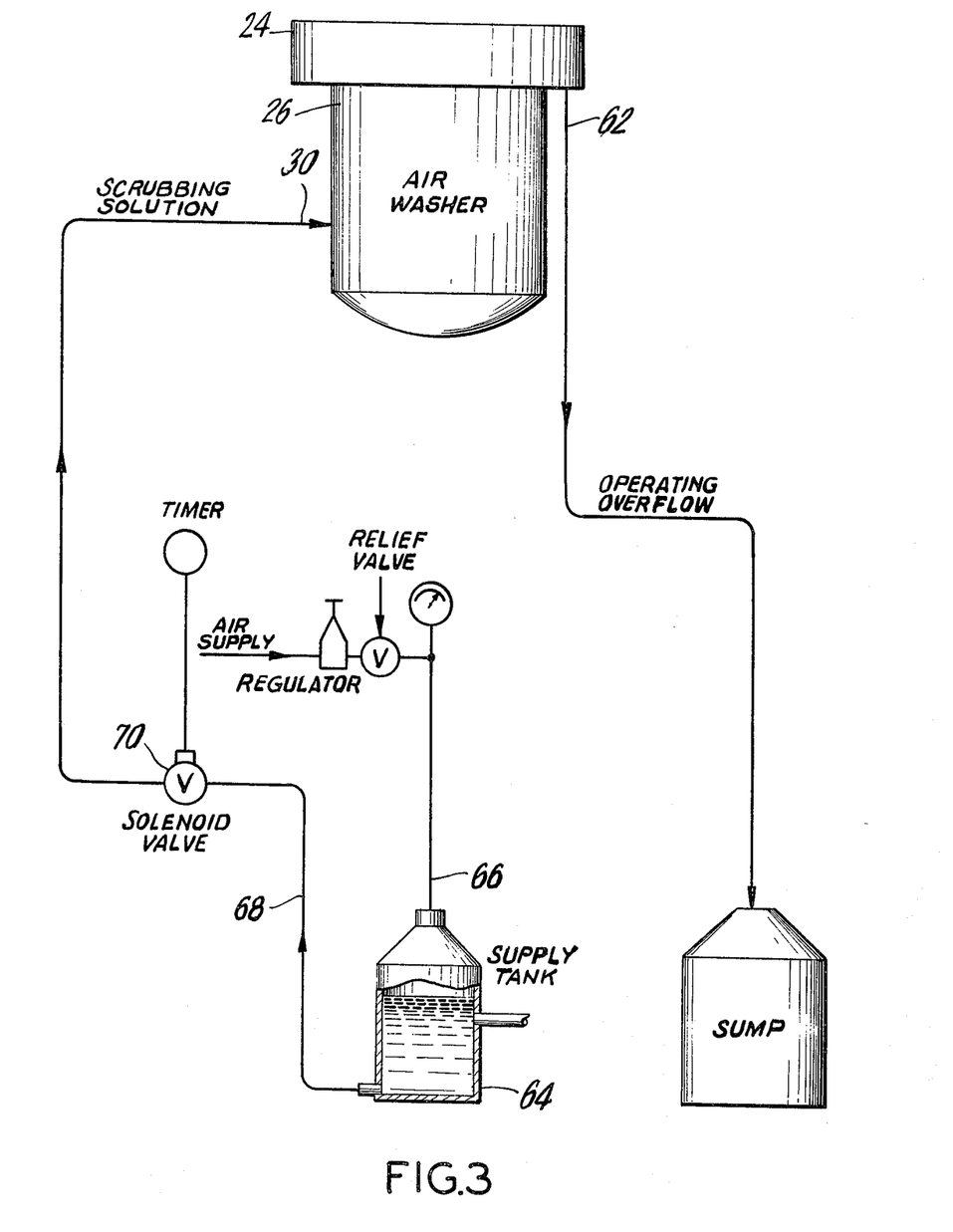
FIG. 3 is a schematic diagram of an automatic feed system for dispensing a controlled flow of scrubbing solution to the inventive air washer to permit continuous, unattended operation.

The input feed of scrubbing liquid is preferably automatic as schematically shown in FIG. 3. A supply tank 64 stores a quantity of scrubbing solution and is pressurized by an air line 66 for forcing the stored solution through line 68 to the inlet 30 of the air washer. A metering valve 70 in line 68 is controlled by a solenoid valve and a timer to admit scrubbing solution intermittently through line 68 to the air scrubber. The waste scrubber solution flows out through waste line 62 to an appropriate sump or sewer.

Different scrubbing liquids are preferred for different pollutants in the air, and surfactants are preferred for air laden with oily or greasy materials or ink. Water is a satisfactory scrubbing liquid for some contaminants, and those skilled in the art will have no difficulty in picking a successful scrubbing liquid for most contaminants. One useful scrubbing solution is suggested in U.S. Pat. No. 3,325,973 hereby incorporated by reference, and another satisfactory scrubbing liquid is a 1% aqueous solution of an ethylene oxide-alkyl phenol condensation product made up in an external tank and fed to the air scrubber.

The clean air output from the air scrubber can be returned to the same room from which the contaminated air was taken or it can be ducted outdoors or to another room. Generally, the clean air output from the inventive scrubber has been found to be odor free and cleaned of contaminant particles as small as 0.1 microns. In some circumstances the dirty, impurity-laden waste liquid output from the air scrubber has been found to pass most of its impurities through a 0.5 micron filter showing that much of the impurities captured by the scrubbing liquid were very small. Liquid kerosene can be sprayed into the inlet of the air scrubber, and the output air is free of any kerosene odor, and many other odor-producing substances can be captured by the inventive air scrubber. The Scrubber can also collect many lints and dusts and airborn materials too small to be visible.

Figure 4:
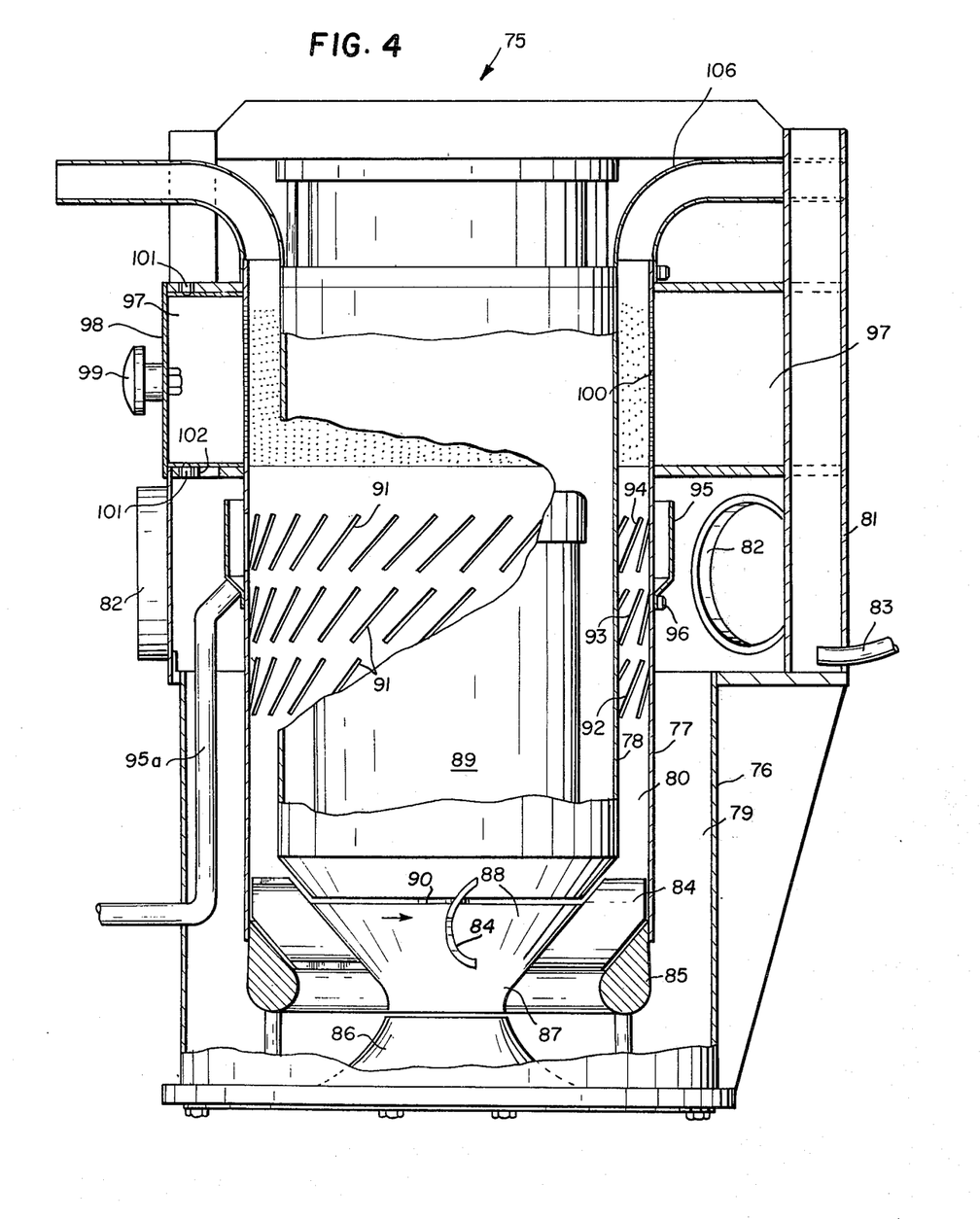
FIGS. 4 and 5 are partially cut-away, cross-sectional views of other preferred embodiments of the inventive air scrubber.
Figure 5:
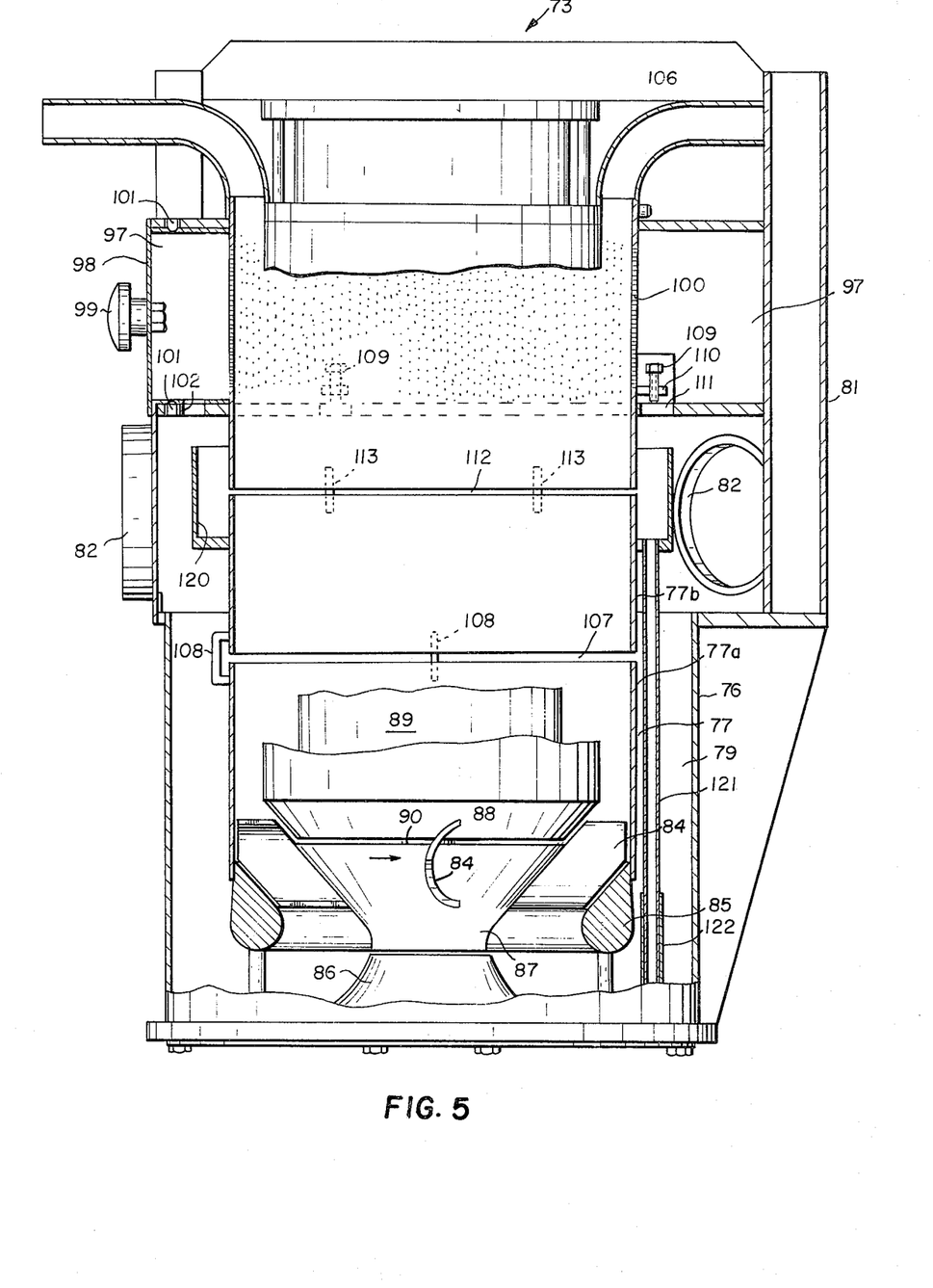
Figure 12:
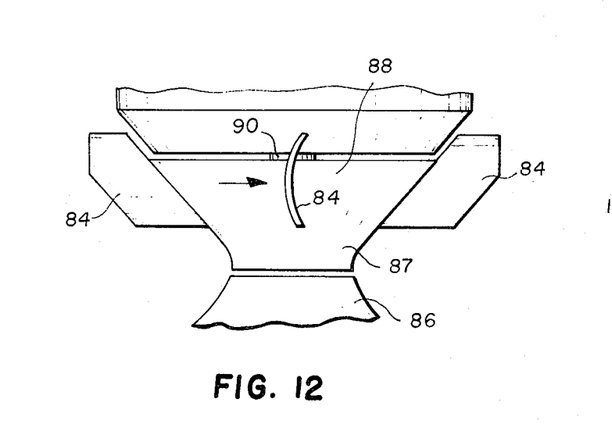
FIG. 12 is a fragmentary, elevational view of a preferred embodiment of fan blade for the inventive scrubber.
Figure 13:
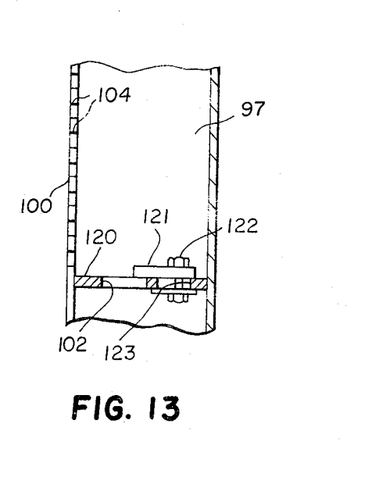
FIG. 13 is a fragmentary, cross-sectional view of a preferred aerosol eliminator for the inventive scrubber.

FIG. 4 shows another preferred embodiment of the inventive air scrubber including some refinements and additional details from the scrubber shown in FIGS. 1 and 2. Scrubber 75 of FIG. 4 has an outer cylindrical wall 76, a cylindrical common wall 77, and an inner housing wall 78 forming a concentric outer chamber 79 and inner chamber 80. An inlet housing 81 has inlet ports 82 as desired to lead contaminated air into outer chamber 79, and a scrubbing liquid input line 83 admits scrubbing liquid periodically into inlet housing 81. Outer chamber 79 joins inner chamber 80 at one end of the scrubber so that air flows around a 180° turn over fairing ring 85 at the end of common wall 77. A fairing 86 leads to a fairing 87 carried on fan 88 to guide air and liquid particles smoothly from outer chamber 79 into fan 88 without allowing any liquid to collect anywhere. A motor 89 supported within inner wall 78 drives fan 88 on shaft 90. Blades 84 of fan 88 are preferably concave toward their direction of motion as indicated by the arrow and as best shown in FIG. 12. Blades 84 then scoop the air and liquid particles at their lower edges, and accelerate air and liquid radially outward and upward into inner chamber 80 so that air and liquid particles leave the upper edges of blades 84 at a velocity slightly greater than the velocity of blades 84, because of the concave blade curvature. This helps fan 88 to break the liquid into very fine mist and aerosol particles and to drive the output at an extremely high velocity into inner chamber 80.

Common wall 77 has a plurality of slots 91 forming through openings between inner chamber 80 and outer chamber 79. Slots 91 are preferably angled by about 45° from the axis of the air scrubber to be approximately perpendicular to the helical flow of the air and liquid mixture in chamber 80. The spinning flow from fan 88 is estimated to advance at an angle of about 45° from a radial cross-sectional plane to form a helical flow having a pitch of about 45° to force air and liquid toward slots 91 at an approximate perpendicular to slots 91. Slots 91 are preferably about 1/16 inch wide and about 3 inches long, and are arranged so that there is no clear path for liquid to flow through any one row of slots. Slots 91 are also spaced far enough from fan to allow adequate space for a continuous centrifugal force that separates substantially all the liquid from the air.

The bottom row 92 of slots 91 form circulation openings for liquid flow from inner chamber 80 to outer chamber 79. As liquid reaches slot row 92, it sprays through in a forceful spray of drops to mix with the contaminated air entering inlet chamber 79. Most of the recirculating liquid passes through the first row 92 of slots 91 and recirculates around the air scrubber.

A liquid waste drain 95 communicating with waste line 952 is formed as an annular manifold encircling common wall 77 and is held in place by a clamp ring 96. Drain manifold 95 is then vertically adjustable relative to upper rows 93 and 94 of slots 91. With drain manifold 95 set in the illustrated position, the upper portions of slot row 93 and all of slot row 94 open into drain manifold 95 for catching and outputting scrubbing solution. Drain manifold 95 can be adjusted either up or down to reduce or increase the slot area opening into manifold 95. Such adjustment regulates the amount of recirculating liquid.

When manifold 95 is set relatively high to communicate only with a portion of upper slot row 94, a larger amount of liquid recirculates around the air scrubber before sufficient liquid accumulates to move past lower slot rows 92 and 93 and exit through upper slot row 94 into drain manifold 95. When manifold 95 is adjusted relatively lower to cover a larger area of slots 91, then a smaller volume of recirculating liquid is required to pass beyond the lower portion of slot row 92 and enter manifold 95. Any such adjustment can be made simply in the field through clamp ring 96, and reasons for such adjustments include recirculating a larger volume of liquid to capture an elusive pollutant or reducing the recirculating liquid volume to eliminate any trace of liquid aerosol or mist from the air output. The liquid throughput rate is a function of the liquid input rate and evaporization had is also preferably adjustable.

The inside of common wall 77 is preferably substantially smooth throughout inner chamber 80 which also is unobstructed to insure minimum turbulence in the output from fan 88. For example, no spokes, struts, or braces are tolerable in inner chamber 80, because they make the swirling flow turbulent and contribute to the collection and re-entraining of liquid into the air so that liquid can escape through the outlet with the clean air. Even a slightly protruding screwhead has been found to create sufficient turbulence to make the scrubber spit out some liquid that it would otherwise capture.

The embodiment of FIG. 4 contains another advantageous feature in the form of an aerosol eliminator 100 formed in the upper part of common wall 77 along the output path from inner chamber 80. Aerosol eliminator 100 is smooth enough relative to passing air flow so as not to create any turbulence, but is open to liquid so that any liquid passing upper slot row 94 is output through aerosol eliminator 100. The reasons for this and the function of aerosol eliminator 100 are explained below.

One reason why the inventive scrubber is so successful is that fan 88 succeeds in breaking the scrubbing liquid into a finely divided, atomized mist or aerosol for contacting an enormous liquid surface area with the air. Also, the inventive scrubber in a size such as mentioned above recirculates a substantial volume of liquid such as 2½ gallons at a rapid rate such as about a complete recirculation every second for a rate of 150 gallons per minute. The air flow velocity achieved within the inventive scrubber reaches 12,000 ft. per minute, and the total air flow rate is 1500 cu. ft. per min. This involves mixing large volumes of finely divided liquid with large quantities of air at high velocities, and it creates a substantial problem in separating the liquid from the air.

Fan 88 provides the separating force by creating the pressure drop from inner chamber 80 to outer chamber 79 and by spinning the air and liquid mixture through inner chamber 80 in a helical path at a very high velocity of, for example, 12,000 ft. per min. This produces substantial centrifugal force on the order of 2500g or 2500 times the weight of any particle, and the centrifugal force continues over a substantial distance. Since liquid particles have substantially more mass than air molecules, they tend to be centrifugally concentrated against common wall 77 by the relatively large centrifugal force created by fan 88. This, and the substantial pressure difference between inner chamber 80 and outer chamber 79 sprays most of the liquid forcefully through lower slot row 92 for recirculation.

However, any slot 91 necessarily produces some turbulence in the passing air flow, and turbulent air tends to pick up and entrain liquid so that some small quantity of liquid skips over and passes any slot. This means that some liquid passes even above uppermost slot row 94 and must be collected somehow if the output air is to be free of contaminants.

Another problem not generally understood in the art is that when a liquid particle is divided, a law of nature holds that the division is between a relatively larger and relatively smaller portion of the original particle and that the larger portions acquire one static electric charge and the smaller portions acquire the opposite static electric charge. This means that the finest of all the aerosol particles, some of which are so fine they are invisible if they escape, all tend to have like charges and to repel each other. As these fine aerosol particles are centrifugally concentrated against wall 77, their like charges tend to keep them apart, and those particles that land on wall 77 tend to keep other particles away from wall 77. Except for aerosol eliminator 100, such fine particles and any other liquid passing beyond upper slot row 94 would be output with the clean air, either as an aerosol or as recombined droplets, and for indoor operation, this is undesirable.

Figure 10:
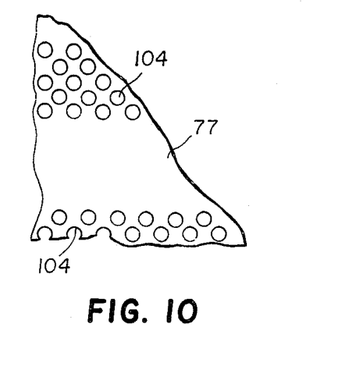
FIG. 10 is a fragmentary, elevational view of preferred aerosol eliminator openings in the common wall between the inner and outer chambers.
Figure 11:
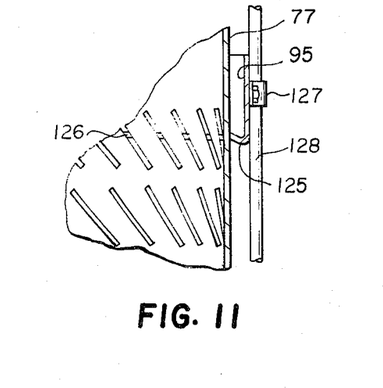
FIG. 11 is a fragmentary, elevational view of a preferred shape and mounting of a drain liquid collector.

Adding more slots in the region of aerosol eliminator 100 would not effectively remove the aerosol, because the slots would create turbulence, stirring the air up sufficiently to prevent capture of the aerosol. The inventive solution is to make aerosol eliminator 100 nearly smooth so as not to produce turbulence in the passing air but forming a multitude of openings 104 in wall 77 as best shown in FIG. 10 and drawing a portion of the air and the centrifugally concentrated aerosol particles through openings 104 before the rest of the clean air enters the air outlet diffuser 106. Holes 104 are smoothly and evenly formed and are preferably bore-hole size of, for example, ⅛ inch diameter and are relatively closely spaced together to open up a substantial extent of the aerosol eliminator region 100. Holes 104 extend around the entire annular extent of cylindrical wall 77 and extend axially of wall 77 for a substantial extent such as 5 or 6 inches.

Aerosol eliminator 100 is formed above inlet housing 81 and communicates with chamber 97 and with the rest of outer chamber 79 through a plurality of openings 102 in a plate 120 so that chamber 97 outside of openings 104 is subjected to a portion of the partial vacuum of outer chamber 79 for drawing air and aerosol particles through openings 104 and then down through openings 102 into the lower portion of outer chamber 79. Openings 102 are preferably adjustable by means of a plate 121 adjustably secured in place by a bolt 122 extending through an adjustment slot 123 in plate 120 to control the size of opening 102 and the vacuum applied to openings 104 and aerosol eliminator 100.

Chamber 97 has drawer-like closures 98 that can be opened by knobs 99, and are retained in place by detents 101 to allow access to the outside of aerosol eliminator 100. some circumstances have produced a siren effect by the air passing over the openings 104, and this can be eliminated in various ways by dampening materials placed in chamber 97 and elsewhere.

The inner face of aerosol eliminator 100 is preferably slightly roughened and given a texture such as produced by shot blasting to produce a roughness that does not create air turbulence but slightly slows down the layer of air and concentrated aerosol particles moving along adjacent wall 77. Slowing down of the outer layer of moving air and aerosol particles helps draw that layer and the aerosol particles through holes 104 so that the scrubber can capture substantially all the aerosol particles and output completely clean air. The roughening of the inside of wall 77 in the region of aerosol eliminator 100 must not be sufficient to produce turbulence in the passing air or the aerosol particles are stirred up by the turbulence and lost through the outlet diffuser 106.

Figures 6, 7:
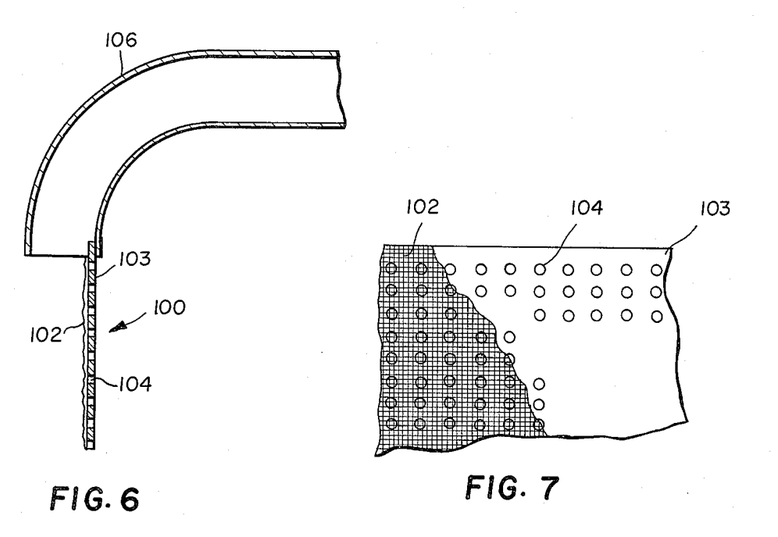
FIG. 6 is a fragmentary, cross-sectional, elevational view of an aerosol eliminator for the inventive scrubber.
FIG. 7 is a fragmentary, partially cut-away, elevational view of the aerosol eliminator of FIG. 6.
Figure 8:
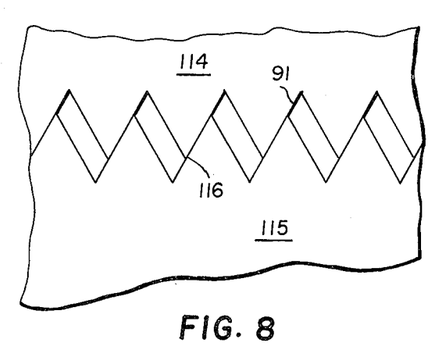
FIGS. 8 and 9 are fragmentary, elevational views of a slot adjustment usable in the inventive air scrubber.
Figure 9:
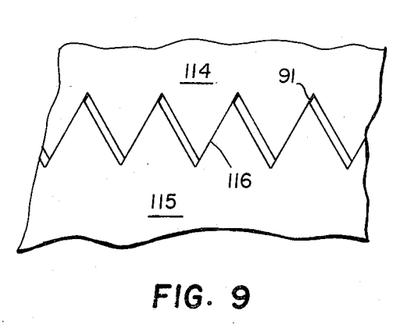

The previously proposed screen 102 over openings 104 as shown in FIGS. 6 and 7 was found to be not as successful as plane openings 104 through wall 77. Also, the previously proposed wool material outside of aerosol eliminator 100 was found to be unnecessary and undesirable.

Openings 104 in wall 77 can probably be made in different sizes, depending upon the pressure drop from inner chamber 80 to chamber 97 at the upper end of outer chamber 79 so long as the holes do not produce turbulence in the passing air. Also, the inside surface of wall 77 and aerosol eliminator region 100 can probably be roughened by processes other than shot blasting to achieve the desired effect of slowing down the layer of air and aerosol moving adjacent wall 77. The above-described holes and roughening have been found to work well, however, and to adjust the scrubber to various contaminants, it is also desirable to control the pressure drop through aerosol eliminator 100 by means such as adjustable plates 121. Openings 104 in aerosol eliminator 100 should be larger than any expected contaminant particles so that lint, dust, fibers, etc., can pass freely through openings 104 and not clog the aerosol eliminator. As presently understood, openings substantially larger than what would ordinarily be regarded as "porous" are preferred. Also, a substantial portion of the passing air must be drawn through openings 104 to entrain and capture the aerosol particles having like charges, and the liquid aerosol particles cannot be collected without removing some of the air with them.

The embodiment of FIG. 4 also includes a diffuser 106 that smoothly guides the output air through a 90° turn to an annular outlet. Diffuser 106 gradually increases the cross-sectional area of the output to help draw air from chamber 80 and increase the throughput rate.

The air scrubber 73 shown in the embodiment of FIG. 5 is similar to air scrubber 75 of FIG. 4, except for circulation and drain outlet slots. Common wall 77 of scrubber 73 has a lower portion 77*a* and an upper portion 77*b* that are movable relative to each other to adjust the width of circulation slot 107. Brackets 108 are secured to lower common wall 77*a* and are slidable relative to upper common wall portion 77*b* which is vertically adjustable by means of screws 109 threaded through brackets 110 on upper wall 77*b* and bearing against fixed housing bars 111. By adjusting screws 109, upper common wall 77*b* is raised and lowered as desired by sliding relative to brackets 108.

Adjustment of the width of slot 107 affects recirculation within scrubber 73 primarily by adjusting air circulation. As slot 107 is widened, more air recirculates around the scrubber with the recirculating liquid so that air is in contact with the liquid for a longer period of time. This reduces the air throughput rate and output velocity but affords a longer time for contacting and removing a pollutant that is otherwise difficult to capture. Narrowing of slot 107 reduces the air circulation and increases the air throughput and output velocity. A slower air output speed reduces the tendency to entrain any liquid aerosol in the output air. In the illustration of FIG. 5, the width of drain slot 112 is fixed by brackets 113 fastened across slot 112, but if desired, slot 112 can also be made adjustable in a similar way that slot 107 is adjusted. Slot 112 opens into drain manifold 120 having a waste line 121 telescoped into line 122 to allow vertical adjustment of slot 107.

Scrubber 73 also includes aerosol eliminator 100, diffuser 106, and other features included in scrubber 75.

FIGS. 7 and 8 show a way of adjusting the width of angular slots 91 such as shown and described relative to scrubber 75 of FIG. 4. Slots 91 are formed between an upper wall 114 and a lower wall 115 and are separated by junction lines 116 where walls 114 and 115 abut in a sliding fit. Relative rotation of walls 114 and 115 by sliding along junction lines 116 adjusts the width of slots 91 as shown in comparing FIGS. 8 and 9. Any desired position is set by a clamp device (not shown). Adjustability of slots 91 controls liquid and air recirculation as described above relative to slot 107 and can also be combined with an adjustable drain manifold 95 such as described above relative to scrubber 75 of FIG. 4.

FIG. 11 shows an improved adjustable waste liquid drain collector. Experience with a waste drain 95 such as shown in FIG. 4 straddling a row of slots 93 showed that the drain in partially obstructing the slots allowed liquid to collect and be spit out of the scrubber with the output air. This was remedied by changing the shape of drain 95 to a shape such as shown in FIG. 11 where the bottom 125 of the drain collector angles upward into engagement with wall 77 and presents a clean edge 126 across slots 93. Drain collector 95 is vertically adjustable by brackets 127 engaging vertical support rods 128 extending either up from the bottom or down from the top of the scrubber so that drain collector 95 can be adjusted as previously described. The clean edge 126 and angled bottom 125 of the drain collector of FIG. 11 do not collect liquid or allow liquid to be re-entrained in the passing air, and the improved drain collector otherwise operates as previously described.

The inventive scrubber can be formed in many ways other than those illustrated. It can be scaled up or down from the parameters described above, and many inlet manifolds are conduits, outlet passageways or diffusers, liquid inputs and drain outputs can readily be devised by those skilled in the art. Chamber walls and housings can be formed in various ways, different shapes and constructions of fairings can be devised, and the scrubber can be powered in different ways by different types and sizes of motors and drives. The impeller for the scrubber fan can have different numbers of blades with different shapes, can be arranged in different positions relative to the inner and outer chambers, can pump axially as well as radially and can turn at different speeds. Preferably, the fan will move the air through the scrubber at substantially more than 4,000 ft. per min. to have the capacity for eliminating odors from contaminated air, and the fan will have sufficient force to rapidly recirculate a substantial volume of liquid at high velocity, and to divide the liquid into an atomized mist as it passes through the fan. The entire inside of the scrubber is preferably swept clean by the air flow and does not afford any pockets where anything can collect.

A liquid drain outlet can be provided at the bottom of the scrubber or at some place other than an opening in the common wall between the inner and outer chambers. The illustrated drain openings are preferred for self regulation of the quantity of liquid circulating within the scrubber, but for some types of pollutants, a bottom waste drain, or a waste drain in some other position may be preferred.

Circulation slots can be formed in ways other than illustrated, and can be made adjustable through other devices. Different numbers, sizes, and spacing of slots are also possible, and it is preferred that slots and any other irregularities within the outlet produce as little turbulence as possible for a smooth separation of fluid throughout the outlet.

The aerosol eliminator can be made and operated in several ways other than those illustrated. The output of the aerosol eliminator can be collected or ducted to a remote location, although recirculation of the output from the aerosol eliminator as illustrated is preferred. Also, different types of generally known diffusers can be used with the inventive scrubber.

Practice of the invention as described above results in a far more effective air scrubber than anything known in the prior art in removing all sorts of air contaminants including particles as small as 0.1 microns, odor-causing materials, and substances heretofore eluding prior art scrubbers. It is also compact, relatively trouble-free to operate, consumes relatively little power, is easy to install, and highly effective and reliable. The inventive scrubber operates successfully with the input of a gallon or two of scrubbing liquid per hour, compared to comparable sized scrubbers presently on the market that require a gallon or two per minute. This is possible because the inventive scrubber does not use nozzles or pumps that can clog up, and its scrubbing liquid can become approximately 60 times as dirty before it must be outlet to a waste drain. This economizes on scrubbing liquid and simplifies waste disposal.

Persons wishing to practice the invention should remember that other embodiments and variations can be adapted to particular circumstances, Even though one point of view is necessarily chosen in describing and defining the invention, this should not inhibt broader or related embodiments going beyond the semantic orientation of this application, but falling within the spirit of the invention. For example, those skilled in the art will appreciate the many variations that can be made to adapt the inventive scrubber to specific circumstances.

I claim:
1. An air scrubber comprising:
 a. means forming inner and outer concentric annular chambers separated by a fixed cylindrical common wall;
 a fan arranged in one end region of said inner chamber for drawing from substantially the entire annular extent of said outer chamber and outputting into substantially the entire annular extent of said inner chamber;
 c. said inner chamber being substantially unobstructed;
 d. the inside of said cylindrical wall being substantially smooth and radially uniform to produce a substantially even flow of air and liquid all around any radial extent of said cylindrical wall;
 e. means forming a clean air outlet from the end of said inner chamber opposite said fan;
 f. a quantity of liquid in said scrubber;
 g. said cylindrical wall having a circulation opening arranged between said inner chamber downstream of said fan and said outer chamber upstream of said fan;
 h. said circulation opening intercepting the entire path of said output from said fan;
 i. means forming a contaminated air inlet into said outer chamber upstream of said circulation opening;
 j. said cylindrical wall having a plurality of bore-hole size aerosol eliminator openings extending through said cylindrical wall throughout a region between said circulation opening and said outlet;
 k. the outside of said aerosol eliminator openings being in communication with said air inlet in said outer chamber; and
 l. means for turning said fan fast enough to:
  1. produce a substantial pressure drop from said inner chamber to said outer chamber to force a portion of said air and substantially all of said liquid through said circulation opening into said outer chamber in a high-velocity spray of liquid particles directed into incoming air from said inlet and to draw a portion of said air and substantially all aerosol particles through said aerosol eliminator openings and back into said outer chamber;
  2. continuously move all of said quantity of liquid along with rapidly moving air and to break said liquid into finely divided particles; and
  3. drive said liquid particles and air in a high-velocity helical path in said inner chamber to subject said air and said liquid particles to a very high centrifugal force centrifugally concentrating said liquid particles near said cylindrical wall and helping to force said liquid through said circulation opening and to draw said aerosol through said aerosol eliminator openings.

2. The air scrubber of claim 1 wherein said circulation opening is a continuous annular slot around said common wall.

3. The air scrubber of claim 2 including means for adjusting the width of said slot.

4. The air scrubber of claim 1 wherein said circulation opening comprises a plurality of slots around said common wall angled to be transverse to air flow in said inner chamber.

5. The air scrubber of claim 4 including means for adjusting the width of said slots.

6. The air scrubber of claim 1 wherein the inside of said cylindrical wall in said region of said aerosol eliminator openings is slightly roughened.

7. The air scrubber of claim 6 wherein said roughened region of said cylindrical wall has a texture produced by shot blasting.

8. The air scrubber of claim 1 including means forming an adjustable opening between said outside of said aerosol eliminator openings and said inlet region of said outer chamber.

9. The air scrubber of claim 1 including means for input of said liquid to said scrubber and means for providing a liquid output from said scrubber.

10. The air scrubber of claim 9 including means for adjusting the distance between said fan and said liquid output means to regulate the total amount of said quantity of said liquid recirculating in said scrubber.

11. The air scrubber of claim 9 wherein said liquid output means includes a drain opening in said common wall further from said fan than said circulation opening.

12. The air scrubber of claim 11 including a drain liquid collector outside said drain opening, said drain liquid connector being adjustable relative to said drain opening to regulate the total amount of said quantity of liquid recirculating in said scrubber.

13. The air scrubber of claim 12 wherein said drain opening comprises a plurality of slots around said common wall angled to be transverse to said air flow in said inner chamber.

14. The air scrubber of claim 9 wherein said circulation opening is a continuous annular slot around said common wall and including means for adjusting the width of said slot.

15. The air scrubber of claim 9 wherein said circulation opening comprises a plurality of slots around said common wall angled to be transverse to air flow in said inner chamber and including means for adjusting the width of said slots.

16. The air scrubber of claim 1 wherein said aerosol eliminator openings are formed as holes in said cylindrical wall and extend all around said cylindrical wall for a substantial axial extent of said cylindrical wall.

17. The air scrubber of claim 9 wherein said aerosol eliminator openings are formed as holes in said cylindrical wall and extend all around said cylindrical wall for a substantial axial extent of said cylindrical wall.

18. The air scrubber of claim 17 including means forming an adjustable opening between said outside of said aerosol eliminator openings and said inlet region of said outer chamber.

19. The air scrubber of claim 18 wherein said circulation opening is a continuous annular slot around said common wall.

20. The air scrubber of claim 19 wherein said fan has blades curved in an axial direction and oriented so both axial edges of said blades precede the axially central regions of said blades in the direction of rotation of said fan.

21. The air scrubber of claim 18 wherein said circulation opening comprises a plurality of slots around said common wall angled to be transverse to air flow in said inner chamber.

22. The air scrubber of claim 21 wherein said fan has blades curved in an axial direction and oriented so both axial edges of said blades precede the axially central regions of said blades in the direction of rotation of said fan.

23. The air scrubber of claim 18 wherein the inside of said cylindrical wall in said region of said aerosol eliminator openings is slightly roughened.

24. The air scrubber of claim 23 wherein said roughened region of said cylindrical wall has a texture produced by shot blasting.

25. The air scrubber of claim 18 including means for adjusting the distance between said fan and said liquid output means to regulate the total amount of said quantity of said liquid recirculating in said scrubber.

26. The air scrubber of claim 25 wherein said liquid output means includes a drain opening in said common wall farther from said fan than said circulation opening.

27. An air scrubber method using a scrubber having inner and outer concentric annular chambers separated by a fixed cylindrical common wall having a circulation opening between said chambers, a fan at one end region of said inner chamber, and bore-hole size aerosol eliminator openings extending through said cylindrical wall beyond said circulation opening from said fan, said method comprising:
 a. placing a quantity of liquid in said scrubber;
 b. operating said fan at a high velocity to circulate said quantity of liquid round and round through said fan to break said liquid into finely divided particles, into said inner chamber in a high-velocity helix centrifugally concentrating said liquid near said cylindrical wall, through said circulation opening in a high-velocity spray into said outer chamber, through said outer chamber and back into said fan with all of said liquid kept in motion;
 c. inputting contaminated air into said outer chamber upstream of said circulation opening so said contaminated air passes through said spray and mixes with said liquid enroute to said fan;
 d. using said fan to maintain a substantial pressure drop from said inner chamber to said outer chamber to assist in said liquid circulation;
 e. adjusting the width of said circulation opening so substantially all of said liquid output from said fan sprays through said circulation opening into said outer chamber and a substantial portion of cleaned air passes beyond said circulation opening toward the output from said inner chamber; and
 f. adjusting a communication opening between the outside of said aerosol eliminator openings and the air inlet region of said outer chamber for drawing a minor portion of said cleaned air and substantially all aerosol particles of said liquid through said aerosol eliminator openings.

28. The method of claim 27 including adding to said liquid and outputting a portion of said liquid during operation.

29. The method of claim 28 including adjusting the distance from said fan of the region for outputting said liquid to regulate the total amount of said quantity of circulating liquid.

30. An air and aerosol separator comprising:
 an unobstructed annular chamber having a generally cylindrical and substantially smooth and radially uniform outer wall;
 b. a fan for driving said air and aerosol mixture in a high-velocity helical path flowing evenly through said chamber to centrifugally concentrate said aerosol near said outer wall;
 c. a plurality of bore-hole size aerosol eliminator openings extending through said cylindrical wall all around said cylindrical wall and extending for a substantial axial extent of said cylindrical wall;
 d. means forming a relatively low pressure region outside said openings; and
 e. means for adjusting said pressure of said low pressure region to draw a portion of said air substantially all of said aerosol through said openings while allowing a major portion of said air to flow past said openings.

31. The air and aerosol separator of claim 30 wherein the inside of said cylindrical wall is slightly roughened throughout the region of said openings.

32. The air scrubber of claim 31 wherein said roughened region of said cylindrical wall has a texture produced by shot blasting.

33. The separator of claim 30 including a circulation opening through said cylindrical wall between said fan and said aerosol eliminator openings, said circulation opening communicating with a low pressure region for outputting larger-than-aerosol liquid particles flowing along said cylindrical wall.

34. The separator of claim 33 including means for adjusting the width of said circulation opening.

35. The separator of claim 34 wherein said circulation opening is an annular slot around said cylindrical wall.

36. The separator of claim 34 wherein said circulation opening is a plurality of slots around said wall angled to be transverse to air flow in said annular chamber.

37. A method of separating a mixture of air and aerosol, said method comprising:
   a. driving said air and aerosol mixture in a high-velocity and uniform helical path along a cylindrical wall to centrifugally concentrate said aerosol near said wall;
   b. passing said air and said centrifugally concentrated aerosol over a plurality of bore-hole size openings extending through said wall without producing substantial turbulence;
   c. creating a relatively low pressure region outside said openings; and
   d. drawing a minor portion of said air and substantially all of said aerosol through said openings while allowing a major portion of said air to flow past said openings.

38. The method of claim 37 including slightly roughening the inside surface of said cylindrical wall in the region of said openings to slow down the air flow immediately adjacent said wall.

39. The method of claim 37 including adjusting the pressure of said region outside said openings.

* * * * *